United States Patent
Inoue et al.

(10) Patent No.: US 7,259,935 B2
(45) Date of Patent: Aug. 21, 2007

(54) MAGNETIC TAPE INCLUDING AN INTERMEDIATE LAYER CONSISTING ESSENTIALLY OF A BINDER

(75) Inventors: Tetsutaro Inoue, Ikeda (JP); Tsugihiro Doi, Ibaraki (JP)

(73) Assignee: Hitachi Maxell, Ltd., Osaka (JP)

( * ) Notice: Subject to any disclaimer, the term of this patent is extended or adjusted under 35 U.S.C. 154(b) by 0 days.

(21) Appl. No.: 10/507,133

(22) PCT Filed: Jul. 2, 2003

(86) PCT No.: PCT/JP03/08387

§ 371 (c)(1), (2), (4) Date: Sep. 10, 2004

(87) PCT Pub. No.: WO2004/006229

PCT Pub. Date: Jan. 15, 2004

(65) Prior Publication Data

US 2005/0142386 A1   Jun. 30, 2005

(30) Foreign Application Priority Data

Jul. 5, 2002    (JP) .............................. 2002-197891

(51) Int. Cl.
*G11B 5/738* (2006.01)

(52) U.S. Cl. ............... 360/132; 360/134; 428/840.1; 428/842

(58) Field of Classification Search ............. 428/840.1, 428/840.5
See application file for complete search history.

(56) References Cited

U.S. PATENT DOCUMENTS

| | | | | |
|---|---|---|---|---|
| 4,617,226 A | * | 10/1986 | Yamaguchi et al. | ........ 428/216 |
| 4,874,633 A | | 10/1989 | Komatsu et al. | |
| 5,726,001 A | * | 3/1998 | Eichorst | ..................... 430/523 |
| 5,958,565 A | | 9/1999 | Hattori et al. | |
| 6,074,724 A | * | 6/2000 | Inaba et al. | ................. 428/141 |
| 6,284,361 B1 | * | 9/2001 | Kobayashi et al. | ......... 428/323 |
| 6,312,796 B1 | * | 11/2001 | Zinbo | ......................... 428/323 |
| 6,733,906 B2 | * | 5/2004 | Kolb et al. | ................. 428/840 |

FOREIGN PATENT DOCUMENTS

| | | |
|---|---|---|
| GB | 1 417 442 A | 12/1975 |
| JP | 48-98803 A | 12/1973 |
| JP | 48-99233 A | 12/1973 |
| JP | 61-139927 A | 6/1986 |
| JP | 62-92132 A | 4/1987 |
| JP | 63-004415 A * | 1/1988 |
| JP | 63-146209 A | 1/1988 |
| JP | 63-164022 A | 7/1988 |
| JP | 2-101627 A | 4/1990 |
| JP | 2-260231 A | 10/1990 |
| JP | 3-17827 A | 1/1991 |
| JP | 3-216812 A | 9/1991 |
| JP | 5-234063 A | 9/1993 |
| JP | 5-234064 A | 9/1993 |
| JP | 5-290353 A | 11/1993 |
| JP | 6-25702 A | 2/1994 |
| JP | 6-139553 A | 5/1994 |
| JP | 8-30957 A | 2/1996 |
| JP | 8-235566 A | 9/1996 |
| JP | 9-293229 A | 11/1997 |
| JP | 10-134306 A | 5/1998 |
| JP | 3046579 A | 3/2000 |
| JP | 2000-277311 A | 10/2000 |
| JP | 2001-181754 A | 7/2001 |
| JP | 2002-56518 A | 2/2002 |
| JP | 2002-92847 A | 3/2002 |
| JP | 2002-133636 A | 5/2002 |
| JP | 2002-140807 A | 5/2002 |

OTHER PUBLICATIONS

Derwent Abstract Translation of JP 63-004415 A (Derwent Acc. No. 1988-046451).*

* cited by examiner

*Primary Examiner*—Kevin M. Bernatz
(74) *Attorney, Agent, or Firm*—Birch, Stewart, Kolasch & Birch, LLP

(57) ABSTRACT

A magnetic tape having a lower non-magnetic layer containing non-magnetic powder and a binder, and an upper magnetic layer containing ferromagnetic powder and a binder, formed on a surface of a tape-form non-magnetic support. This magnetic tape has an intermediate binder layer, which is under the upper magnetic layer and has an average dry thickness of 10 to less than 50 nm. The average dry thickness of the upper magnetic layer is 5 to 100 nm, and the squareness ratio of the upper magnetic layer in the lengthwise direction is 0.8 or more. In this magnetic tape, the thickness of the magnetic layer and the fluctuation at the interface between the magnetic layer and the intermediate binder layer under the magnetic layer can be controlled. As a result, the PW50 value of a solitary waveform and modulation noise can be reduced. Thus, the magnetic tape shows excellent C/N characteristics.

10 Claims, No Drawings

MAGNETIC TAPE INCLUDING AN INTERMEDIATE LAYER CONSISTING ESSENTIALLY OF A BINDER

TECHNICAL FIELD

The present invention relates to a magnetic tape, in particular, a coating type magnetic tape which is suitably used for backup of data of a computer.

BACKGROUND ART

Magnetic tapes have found various applications in audio tapes, videotapes, computer tapes, etc. In particular, in the field of magnetic tapes for data-backup, tapes with recording capacities of several tens to 100 GB per reel are commercialized in association with increased capacities of hard discs for back-up. Under such circumstances, a backup tape with a capacity of as large as 100 GB or more has been proposed, and it is indispensable for such a backup tape to have a higher recording density.

In the production of a magnetic tape capable of meeting such a demand for higher recording density, the use of very fine ferromagnetic powder improved in magnetic properties is needed, and further improvements of the filling property and dispersibility of the ferromagnetic powder are needed. As the wavelengths of signals for use in recording becomes shorter and shorter, it is more and more necessary to reduce the thickness of a magnetic layer so as to lessen demagnetization due to a demagnetizing field which is caused during the recording/reproducing of data.

To improve the magnetic properties of ferromagnetic powder, it is desirable that residual magnetization of a magnetic layer should be large so as to obtain higher output. For this purpose, the use of ferromagnetic iron-based metal powder as magnetic powder has been prevailed over the use of conventional oxide magnetic powder and cobalt-containing iron oxide magnetic powder. For example, ferromagnetic iron-based metal powder having a coercive force (Hc) of 119 kA/m (1,500 Oe) or more is proposed (JP-A-5-234064, JP-A-6-25702, JP-A-6-139553, etc.). Further, there are proposed rare earth-iron-based magnetic powder, such as rare earth-iron-boron-based magnetic powder (JP-A-2001-181754) which comprises substantially spherical or ellipsoidal particles in which the ratio of the major axis/the minor axis is 1 to 2, and rare earth-iron-based magnetic powder (JP-A-2002-56518). As the rare earth elements for use in any of these magnetic powders, at least one element selected from the group consisting of yttrium, ytterbium, cesium, praseodymium, samarium, lanthanum, europium, neodymium and terbium is used. Among them, neodymium (Nd), samarium (Sm), terbium (Tb) and yttrium (Y) are preferably used. Other than those, there is known iron nitride-based magnetic powder which comprises substantially spherical (or cubic) particles having a phase of $Fe_{16}N_2$ as a main phase and a BET specific surface area of 10 $m^2/g$ or more (JP-A-2000-277311). The coercive forces of these magnetic powders which comprise substantially spherical or ellipsoidal particles are 80 kA/m or more.

To improve the magnetic properties of a magnetic layer comprising ferromagnetic powder, it is effective to improve the dispersibility of the ferromagnetic powder. To improve the dispersibility of the ferromagnetic powder, the following methods are proposed: a binder having a polar functional group such as a sulfonic acid group, phosphoric acid group or a salt of any of these acids with an alkali metal is used; a dispersant having a low molecular weight is used in combination with a binder; the step of kneading and dispersing a magnetic coating composition is continuously carried out; a lubricant is added after the dispersion; and so on (cf. JP-A-2-101624, JP-A-3-216812, JP-A-3-17827, JP-A-8-235566, etc.).

To improve the magnetic properties of the magnetic layer, it is also necessary for the magnetic layer to contain magnetic powder at high density. Generally, the amount of the magnetic powder contained in the magnetic layer per unit area is expressed by a Mrt value (i.e., a product of the residual magnetic flux density and the thickness of the magnetic layer, which is hereinafter simply referred to as "Mrt"), and as this value increases, the resultant reproducing output increases. However, when the value of Mrt is increased, the value of PW50 of a solitary waveform concurrently increases. The value of PW50 herein referred to is a value which expresses a peak half-value width of a reproduced solitary waveform, namely, the reproduced waveform of a signal recorded on a magnetic recording medium by one pulse of recording current, in unit of length. This value, hereinafter, is simply referred to as "PW50". Since a larger value of PW50 indicates a decrease in resolving power, it is impossible to record or reproduce signals at a high recording density. For this reason, it is meaningless to unnecessarily increase the value of Mrt.

On the other hand, the latest development of reproduction systems utilizing MR heads (reproduction magnetic heads comprising magnetoresistance effect elements) further accelerates the shortening of recording wavelengths. For example, a recent model of digital data storage system can record signals with the shortest wavelengths of 500 nm or less. When MR heads are used, saturation of MR elements (magnetoresistance effect elements) occurs when a Mrt value to each of the MR elements exceeds a suitable value. As a result, the increment of noises as a background increases, although an output is hardly increased. Consequently, the value of C/N, detected when signals are actually reproduced, becomes smaller, and efficient electromagnetic conversion cannot be attained (cf. Japanese Patent No. 3046579 and JP-A-10-134306). Therefore, it is necessary to decrease the thickness of a magnetic layer to one third or less of the shortest recording wavelength, on the assumption that the residual magnetic flux density is not changed. This means that a very thin magnetic layer with a thickness of 100 nm or less is needed for a magnetic recording/reproducing system, as mentioned above.

In the meantime, other than the high performance magnetic layer as mentioned above, a magnetic recording medium suitable for recording signals with short wavelengths is proposed in which a lower non-magnetic layer is provided between a non-magnetic support and a thin magnetic layer with a thickness of 600 nm or less (cf. JP-A-5-234063). In this magnetic recording medium, the upper magnetic layer is formed with a reduced thickness to optimize the value of Mrt and reduce self-demagnetization loss and reproduction loss, and also to suppress the deterioration of traveling performance and durability of the magnetic medium which are induced by the decrease of the thickness of a magnetic layer.

Further, in the system using the MR head, when the number of ferromagnetic particles in the volume of reversal of magnetization is larger, noises can be decreased to achieve a higher ratio of C/N. This is advantageous to achieve high recording density, and for such high density recording, it is necessary to use micronized magnetic particles with major axes of 100 nm or less.

However, there is a limit in the formation of a thinner magnetic layer by providing a lower non-magnetic layer as mentioned above. As a matter of fact, it is difficult to form a magnetic layer with a thickness of 100 nm or less, in view of the controlling of a layer thickness and the productivity. Even if a magnetic layer with a thickness of approximate 100 nm could be formed, it would be very difficult to control, to 50 nm or less, the interfacial fluctuation at the interface between the upper magnetic layer and the lower non-magnetic layer. When the v fluctuation at the interface between the upper and lower layers is large, modulation noise (a noise with a frequency close a carrier frequency) becomes higher, so that it is impossible to achieve efficient electromagnetic conversion.

JP-A-5-290353 proposes the provision of an intermediate layer between an upper magnetic layer and a lower non-magnetic layer. However, this invention intends to orient the particles in the upper magnetic layer obliquely or vertically, and the thickness of the intermediate layer is 100 to 800 nm. Thus, the fluctuation at the interface between the upper magnetic layer and the intermediate layer, on the contrary, becomes very large. Further, because of the thick intermediate layer, a lubricant cannot be fed from the lower non-magnetic layer to the upper magnetic layer. As a result, the durability of the magnetic tape becomes poor.

DISCLOSURE OF THE INVENTION

The present invention is developed to solve the above problems of the prior art, and an object of the invention is to provide a magnetic tape which shows a small PW50 value and a high C/N value to achieve high electromagnetic conversion.

As a result of the present inventors' intensive researches, it has been found that efficient electromagnetic conversion can be achieved by providing an intermediate binder layer which consists essentially of a binder (or a binder resin) and has an average dry thickness of 10 nm to less than 50 nm, just under an upper magnetic layer. By doing so, the thickness of the upper magnetic layer can be controlled to 100 nm or less, and the fluctuation at the interface between both the layers can be kept small, with the result that high electromagnetic conversion can be achieved.

Accordingly, the present invention provides a coating type magnetic tape comprising a tape-form non-magnetic support, and a lower non-magnetic layer containing non-magnetic powder and a binder and an upper magnetic layer containing ferromagnetic powder and a binder, both of which are formed on the tape-form non-magnetic support, and this magnetic tape is characterized in that an intermediate binder layer consisting essentially of a binder is provided just under the upper magnetic layer, that the upper magnetic layer is formed while the intermediate binder layer is being in a wet state, that the upper magnetic layer has an average dry thickness d of 5 to 100 nm, that the intermediate binder layer has an average dry thickness of 10 to less than 50 nm, and that the squareness ratio of the upper magnetic layer in the lengthwise direction is 0.8 or more.

In this regard, the word "essentially" in the wording of "the intermediate binder layer consisting essentially of a binder" means that the weight in total of organic materials having a molecular weight of 1,000 or less serving to improve the dispersibility of the resultant coating composition, and inorganic materials serving to control the electric conductivity is 3 wt. % or less based on the weight of the dried intermediate binder layer.

As a preferable binder to form the intermediate binder layer, an organic polymer soluble in an organic solvent or water is used. Preferably, the intermediate binder layer is provided while the lower non-magnetic layer is still in a wet state, or after the lower non-magnetic layer is applied and dried.

Suppose that the maximum value of the fluctuation at the interface between the upper magnetic layer and the intermediate binder layer, measured along the widthwise direction, is PVt, and that the ratio of this maximum value PVt to the average dry thickness d of the upper magnetic layer (PVt/d) is less than 0.5 [(PVt/d)<0.5]. This is preferable because the interface between the upper magnetic layer and the intermediate binder layer becomes smooth. Further, suppose that the maximum value of the fluctuation at the interface between the upper magnetic layer and the intermediate binder layer, measured along the lengthwise (machine) direction, is PVm, and that the ratio of this maximum value PVm to the average dry thickness d of the upper magnetic layer (PVm/d) is less than 0.5 [(PVm/d)<0.5]. This is also preferable because the interface between the upper magnetic layer and the intermediate binder layer becomes smooth.

The center line average height (Ra) of the surface of the upper magnetic layer is preferably from 0.5 to 5 nm, more preferably 4 nm or less, most preferably from 1 to 3 nm. When Ra exceeds 5 nm, the spacing between the magnetic head and the medium increases, so that sufficient reproducing output cannot be obtained. When Ra is less than 0.5 nm because of excessive improvement of the surface smoothness, the friction coefficient between the magnetic head and the medium increases, so that the traveling property and durability of the tape becomes poor.

The residual magnetic flux density (Br) of the upper magnetic layer is preferably from 0.3 to 0.5T, more preferably 0.32T or more, most preferably from 0.35 to 0.4T. When Br is less than 0.3T, a leakage flux from the magnetic recording medium becomes smaller. As a result, sufficient reproducing output cannot be obtained. On the contrary, when Br exceeds 0.5T, the value of Mrt also increases. As a result, the value of PW50 increases.

Modes for Carrying out the Invention

The present invention is mainly applied to a magnetic tape for digital recording. A magnetic tape according to the present invention comprises a lower non-magnetic layer formed on at least one surface of a non-magnetic support, and an intermediate binder layer and an upper magnetic layer formed in this order on the lower non-magnetic layer. When the particularly high tape-traveling reliability is required, a backcoat layer may be provided on the other surface of the non-magnetic support, i.e., the surface of the non-magnetic support opposite to the surface of the substrate carrying a surface coating layer comprising the lower non-magnetic layer, the intermediate binder layer and the upper magnetic layer thereon. Hereinafter, the magnetic tape of the present invention will be described in more detail.

<Non-Magnetic Support>

In the present invention, a tape-form non-magnetic support is used.

The Young's modulus of the non-magnetic support in the lengthwise direction is preferably at least 5.9 GPa (600 kg/mm$^2$), and the Young's modulus thereof in the widthwise direction is preferably at least 3.9 GPa (400 kg/mm$^2$). More preferably, the Young's modulus of the non-magnetic support in the lengthwise direction is at least 9.8 GPa (1,000 kg/mm$^2$), and the Young's modulus thereof in the widthwise direction is at least 7.8 GPa (800 kg/mm$^2$). When the Young's modulus of the non-magnetic support in the lengthwise direction is less than 5.9 GPa (600 kg/mm$^2$), the traveling of the tape is unstable. When the Young's modulus thereof in the widthwise direction is less than 3.9 GPa (400 kg/mm$^2$), the edges of the tape are easily damaged.

Examples of the non-magnetic support which satisfies the above requirements include a polyethylene terephthalate film, polyethylene naphthalate film, biaxially oriented aromatic polyamide film, aromatic polyimide film, etc. The thickness of the non-magnetic support may vary depending on the end use of the magnetic tape, and it is generally 2 to 7 μm, preferably 2.5 to 4.5 μm. When the thickness of the non-magnetic support is less than 2 μm, it is difficult to form a film for the support, and the strength of the resultant magnetic tape tends to lower. When the thickness of the non-magnetic support exceeds 7 μm, the total thickness of the magnetic tape is increased, so that the recording capacity per reel decreases. The center line average height (Ra) of one surface of the non-magnetic support (i.e. the surface having the surface coating layer formed thereon) is preferably from 2.5 to 20 nm. When Ra is 20 nm or less, the roughness of the surfaces of the lower non-magnetic layer and the magnetic layer becomes smaller, even though the lower non-magnetic layer is formed thinner. When Ra is less than 2.5 nm, it is difficult to feed a base film in the course of the production of the tape, which results in poor productivity.

<Lower Non-Magnetic Layer>

The lower non-magnetic layer contains non-magnetic inorganic powder in order to improve the strength. As the inorganic powder, powder of a metal oxide, salt of alkali earth metal or the like is used, and particularly powder of a metal oxide is preferred. Specifically, powder of iron oxide with a particle size of 50 to 400 nm is preferred. Preferably, the amount of iron oxide to be added is 35 to 83 wt. % based on the weight of a whole of the inorganic powder. When the particle size is less than 50 nm, it is difficult to uniformly disperse the powder. When the particle size exceeds 400 nm, the unevenness of the interface between the lower non-magnetic layer and the upper magnetic layer thereon increases. When the addition amount is less than 35 wt. %, the effect of improving the strength of the film is insufficient. When it exceeds 83 wt. %, the film strength, on the contrary, becomes poor.

Preferably, alumina, particularly alumina which mainly has a corundum phase, is added to the lower non-magnetic layer. The amount of alumina to be added is 2 to 30 wt. %, preferably 8 to 20 wt. %, more preferably 11 to 20 wt. %, based on the weight of a whole of the non-magnetic powder. When the amount of alumina is less than 2 wt. %, the flowability of the resultant coating composition is insufficient. When it exceeds 30 wt. %, the unevenness of the interface between the lower non-magnetic layer and the upper magnetic layer thereon increases. The particle size of alumina to be added is preferably 100 nm or less, more preferably from 10 to 100 nm, particularly from 30 to 90 nm, most preferably from 50 to 90 nm. The use of alumina with a particle size exceeding 100 nm degrades the effect of smoothening the surface of the lower non-magnetic layer. This is remarkable when there is used a non-magnetic support which has a low smoothness so that the roughness of one surface of the non-magnetic support (the surface having the surface coating layer formed thereon) is 20 nm or more, on the condition that the thickness of the lower non-magnetic layer is as thin as 1.5 μm or less. In the meantime, the use of a small amount of alumina which mainly has a corundum phase (the content of α-alumina: 30% or higher) is effective to increase the Young's modulus of the lower non-magnetic layer, as compared with the use of θ-, δ- or γ-alumina, and to enhance the strength of the resultant tape. Consequently, fluctuation in output due to waving of the edges of the tape (i.e. edge weave) can be reduced.

In addition, less than 3 wt. % of α-alumina with a particle size of 100 to 800 nm may be added based on the weight of a whole of the inorganic powder, together with the above alumina with a particle size in the above range.

Carbon black (CB) may be added to the lower non-magnetic layer in order to improve electric conductivity. Examples of carbon black include acetylene black, furnace black, thermal black, etc. Carbon black with a particle size of 5 to 200 nm, preferably 10 to 100 nm is used. Since the particles of carbon black have their own structures, it is hard to disperse carbon black with a particle size of 10 nm or less, and the use of carbon black with a particle size of 100 nm or more degrades the smoothness of the lower non-magnetic layer. The amount of carbon black to be added is preferably from 15 to 40 wt. % based on the weight of a whole of the non-magnetic powder in the lower non-magnetic layer, although the amount of carbon black varies depending on the particle size of carbon black. When the amount of carbon black added is less than 15 wt. %, the electric conductivity-improving effect is poor. When it exceeds 40 wt. %, this effect is saturated. The use of 15 to 35 wt. % of carbon black with a particle size of 15 to 80 nm is preferable, and the use of 20 to 30 wt. % of carbon black with a particle size of 20 to 50 nm is more preferable. The addition of the above amount of carbon black with the above particle size is effective to lower the electric resistance and to reduce static noises and fluctuation in tape-traveling.

The thickness of the lower non-magnetic layer is generally 300 to 3,000 nm, preferably 500 to 2,000 nm. It is difficult to form a lower non-magnetic layer with a thickness of less than 300 nm by coating, and thus, the productivity is poor. On the other hand, when the thickness of the lower non-magnetic layer exceeds 3,000 nm, the total thickness of the tape increases, and the recording capacity per one reel of the tape becomes smaller.

A known primer layer may be provided between the non-magnetic support and the lower non-magnetic layer in order to improve their adhesion. In this case, the thickness of the primer layer is preferably from 10 to 2,000 nm, more preferably from 50 to 500 nm.

<Upper Magnetic Layer>

The upper magnetic layer comprises a binder and ferromagnetic powder dispersed in the binder, and this layer is used as a magnetic recording layer. Preferable ferromagnetic powder to be added in the upper magnetic layer is ferromagnetic iron-based metal powder. The coercive force of such powder is preferably from 135 to 279 kA/m (1,700 to 3,500 Oe), and the saturation magnetization thereof is preferably from 90 to 200 A·m$^2$/kg (90 to 200 emu/g), more preferably from 100 to 180 A·m$^2$/kg (100 to 180 emu/g). The magnetic properties of this ferromagnetic iron-based metal powder and of the upper magnetic layer (as will be described later) are indicated by values measured with a sample-vibration type flux meter, under an external magnetic field of 1.27 MA/m (16 kOe).

The average length of the major axes of particles of the ferromagnetic iron-based metal powder is preferably from 10 to 100 nm, more preferably from 20 to 60 nm. When the average length of the major axes exceeds 100 nm, particle noises depending on the particle sizes become larger, and it becomes hard to improve the C/N characteristics. When the average length of the major axes is less than 10 nm, the coercive force of the upper magnetic layer decreases, and also the agglomeration of the magnetic powder increases. As a result, the dispersion of the magnetic powder in a coating composition is hard. In this connection, the average length of the major axes of the ferromagnetic iron-based metal powder is determined as follows: the sizes of 100 particles, selected from a photograph taken with a transmission type electron microscope (TEM) of 100,000 diameters, are measured and averaged. The BET specific surface area of this ferromagnetic iron-based metal powder is preferably from 35 to 85 $m^2/g$, more preferably from 40 to 80 $m^2/g$, most preferably from 50 to 70 $m^2/g$.

In the present invention, the average dry thickness d of the upper magnetic layer is from 5 to 100 nm. When the average dry thickness d of the upper magnetic layer is less than 5 nm, it becomes very difficult to form the magnetic layer, which results in very poor productivity, and the leakage magnetic field from the magnetic layer is small, so that output from the head decreases. When the average dry thickness d of the upper magnetic layer exceeds 100 nm, output from the head decreases due to thickness loss, and the value of Mrt increases, so that the value of PW50 increases. As a result, high density magnetic recording becomes impossible. The average dry thickness d of the upper magnetic layer is preferably from 10 to 90 nm, more preferably from 20 to 60 nm.

The coercive force of the upper magnetic layer is preferably from 135 to 279 kA/m (1,700 to 3,500 Oe) in the head-traveling direction, and the residual magnetic flux density is 0.30 T (3,000 G) or more in the tape lengthwise direction. Since the production of a tape with a residual magnetic flux density of 0.5 T (5,000 G) or more is difficult, the upper limit of the residual magnetic flux density is practically 0.5 T (5,000 G). When the coercive force of the upper magnetic layer is less than 135 kA/m, output from the head decreases due to a demagnetic field. When it exceeds 279 kA/m, writing on the magnetic tape with the head is difficult. When the residual magnetic flux density is less than 0.30 T, output from the head decreases. More preferably, the coercive force is from 159 to 239 kA/m (2,000 to 3,000 Oe), and the residual magnetic flux density is 0.35 to 0.5 T (3,500 to 5,000 G).

When the magnetic recording medium of the present invention is loaded on a system which uses MR heads as reproducing heads, it is preferable that the value of Mrt, which is the product of the residual magnetic flux density in the lengthwise direction of the upper magnetic layer and the thickness of the magnetic layer, is 72 nTm (5.7 memu/$cm^2$) or less, and that the squareness ratio is 0.80 or more. When the value of Mrt exceeds 72 nTm, outputs detected from most of the MR heads become too large and are saturated. The value of Mrt is preferably 2 nTm or more to enhance reproducing outputs. When the squareness ratio is less than 0.80, recording demagnetization due to thermal agitation is caused. The value of Mrt is more preferably from 2 to 36 nTm (0.16 to 2.9 memu/$cm^2$), and the squareness ratio is more preferably from 0.90 to 0.97.

The upper magnetic layer may contain a known abrasive material. Examples of the abrasive material include α-alumina, β-alumina, silicon carbide, chrome oxide, cerium oxide, α-iron oxide, corundum, artificial diamond, silicon nitride, titanium carbide, titanium oxide, silicon dioxide, boron nitride, etc. most of which have Mohs' hardness of 6 or more. Each of these abrasive materials may be used alone, or in combination. Above all, alumina is particularly preferable since the use of a small amount of alumina is enough to show a high head-cleaning effect because of the high hardness of alumina. The average particle size of the abrasive material depends on the thickness of the magnetic layer, and it is preferably from 20 to 400 nm, more preferably from 30 to 300 nm. The amount of the abrasive material to be added is preferably from 5 to 20 wt. parts, more preferably from 8 to 18 wt. parts, per 100 wt. parts of the ferromagnetic iron-based metal powder.

The upper magnetic layer of the magnetic recording medium of the present invention may further contain a known carbon black (CB) in order to improve the electric conductivity and the surface smoothness. As this carbon black, acetylene black, furnace black, thermal black or the like may be used. In general, carbon black with a particle size of from 5 to 200 nm is used. Further, the use of carbon black with a particle size of 10 to 100 nm is preferable, and the use of carbon black with a particle size of 10 to 50 nm is more preferable. When the particle size is less than 10 nm, the dispersion of carbon black is difficult. When the particle size exceeds 100 nm, it is needed to add a large amount of carbon black. In either case, the surface of the magnetic layer becomes coarse, which leads to a decrease in output. The amount of carbon black is preferably 0.2 to 5 wt. parts, more preferably 0.5 to 4 wt. parts per 100 wt. parts of the ferromagnetic iron-based metal powder.

<Intermediate Binder Layer>

An intermediate binder layer is provided just under the upper magnetic layer, i.e., between the upper magnetic layer and the lower non-magnetic layer. The thickness of the intermediate binder layer is preferably 10 to less than 50 nm, more preferably 20 to less than 40 nm.

Preferably, either of the ratios of the maximum values (PVt and PVm) of fluctuation in the thickness measured at the interface between the intermediate binder layer and the upper magnetic layer in both the widthwise and lengthwise directions, to the thickness d of the upper magnetic layer, (PVt/d) and (PVm/d), is less than 0.5.

When the thickness of the dried intermediate binder layer is less than 10 nm, the fluctuation in the thickness at the interface between the lower non-magnetic layer and the intermediate binder layer is generally larger than this value (10 nm). Therefore, it becomes hard that the fluctuation at the interface therebetween is sufficiently evened. When the thickness of the dried intermediate binder layer is 50 nm or more, the smoothing effect is saturated, and it becomes difficult to stably lay the upper magnetic layer on the intermediate non-magnetic layer. Japanese Patent No. 2666810 discloses that, if the conditions are optimized, a relationship among an average value Δd of the fluctuation at the interface, thickness d of the magnetic layer (equivalent to t in this specification) and a standard deviation σ at the interface can satisfy the requirement of $\Delta d/d \leq 0.5$ or $\Delta \leq 0.2$ μm, even if no intermediate layer is provided. Since the values PVt and PVm of the fluctuation at the interface referred to in this specification are equivalent to 3×Δd and 5×σ, the fluctuation at the interface, equivalent to $\Delta d/d \leq 0.17$ and $\sigma \leq 0.04$ μm, can be achieved by providing an intermediate binder layer, according to the description of the above Japanese patent specification. Therefore, the techniques of the present invention can provide a magnetic layer having a far smaller fluctuation at the interface than that obtained by the techniques disclosed in Japanese Patent No. 2666810. Further, by expressing the fluctuation at the interface as a difference between a maximum value and a <Lubricant>

Preferably, the lower non-magnetic layer contains 0.5 to 5.0 wt. % of a higher fatty acid and 0.2 to 3.0 wt. % of a higher fatty acid ester based on the total weight of the powder components contained in the upper magnetic layer and the lower non-magnetic layer. This is because the coefficient of friction of the magnetic tape against a head can be decreased. When the amount of the higher fatty acid is less than 0.5 wt. %, the effect to decrease the coefficient of friction is insufficient. When the amount of the higher fatty acid exceeds 5.0 wt. %, the lower non-magnetic layer may be plasticized and thus the toughness of the non-magnetic layer may be lost. When the amount of the higher fatty acid ester is less than 0.2 wt. %, the effect to decrease the coefficient of friction is insufficient. When the amount of the higher fatty acid ester exceeds 3.0 wt. %, the amount of the higher fatty acid ester which migrates to the magnetic layer becomes too large, so that the magnetic tape may stick to the head.

Preferably, a fatty acid having 10 or more carbon atoms is used. Such a fatty acid may be a linear or branched fatty acid, or an isomer thereof such as a cis-form or trans-form. However, a linear fatty acid is preferable because of its excellent luburicity. Examples of such a fatty acid include lauric acid, myristic acid, stearic acid, palmitic acid, behenic acid, oleic acid, linoleic acid, etc., among which myristic acid, stearic acid and palmitic acid are preferable. The amount of the fatty acid to be added to the magnetic layer is not particularly limited, since the fatty acid migrates between the lower non-magnetic layer and the magnetic layer. Thus, the sum of the fatty acids added to the magnetic layer and the lower non-magnetic layer is adjusted to the above-specified amount. When the fatty acid is added to the lower non-magnetic, the magnetic layer may not necessarily contain the fatty acid.

Preferably, the upper magnetic layer contains 0.5 to 3.0 wt. % of a fatty acid amide and 0.2 to 3.0 wt. % of a higher fatty acid ester, based on the weight of the magnetic powder. This is because the coefficient of friction of the magnetic tape being fed can be decreased. When the amount of the fatty acid amide is less than 0.5 wt. %, the direct contact of the head to the magnetic layer tends to occur, and therefore, the burning-preventing effect is poor. When the amount of the fatty acid amide exceeds 3.0 wt. %, the fatty acid amide may bleed out and causes a defect such as dropout. When the amount of the higher fatty acid ester is less than 0.2 wt. %, the effect of decreasing the frictional coefficient is poor. When it exceeds 3.0 wt. %, a side effect such as sticking of the tape to the head may occur.

As the fatty acid amide, there can be used amides of fatty acids each having 10 or more carbon atoms, such as amides of palmitic acid, stearic acid and the like. In this regard, the intermigration of the lubricant between the magnetic layer and the lower non-magnetic layer may be allowed.

<Binder>

As binders to be contained in the lower non-magnetic layer and the upper magnetic layer, there can be used a combination of a polyurethane resin with at least one resin selected from the group consisting of a vinyl chloride resin, a vinyl chloride-vinyl acetate copolymer, a vinyl chloride-vinyl alcohol copolymer, a vinyl chloride-vinyl acetate-vinyl alcohol copolymer, a vinyl chloride-vinyl acetate-maleic anhydride copolymer, a vinyl chloride-hydroxyl group-containing alkyl acrylate copolymer, and nitrocellulose. Among them, a combination of a vinyl chloride-hydroxyl group-containing alkyl acrylate copolymer with a polyurethane resin is preferred. Examples of the polyurethane resin include polyesterpolyurethane, polyetherpolyurethane, polyetherpolyesterpolyurethane, polycarbonatepolyurethane, polyestrepolycarbonatepolyurethane, etc.

These binder is used in an amount of 7 to 50 parts by weight, preferably 10 to 35 parts by weight, based on 100 parts by weight of the ferromagnetic iron-based metal powder in the upper magnetic layer and 100 parts by weight of a whole of the non-magnetic powder in the lower non-magnetic layer, respectively. In particular, the best combination as the binder is 5 to 30 parts by weight of a vinyl chloride-based resin and 2 to 20 parts by weight of a polyurethane resin.

There is used a binder which comprises a polymer having, as a functional group, $-COOH$, $-SO_3M$, $-OSO_3M$, $-P=O(OM)_3$, $-O-P=O(OM)_2$ [wherein M is a hydrogen atom, an alkali metal base or an amine salt], $-OH$, $-NR_1R_2$, $-N^+R_3R_4R_5$ [wherein $R_1$, $R_2$, $R_3$, $R_4$ and $R_5$ are, each independently a hydrogen atom or a hydrocarbon group], or an epoxy group. The reason why such a binder is used is that the dispersibility of the magnetic powder, etc. is improved as mentioned above. When two or more resins are used in combination, preferable the polarities of the functional groups of the resins are the same. In particular, the combination of resins both having $-SO_3M$ groups is preferable.

Preferably, the binder is used in combination with a thermally curable crosslinking agent which bonds with the functional groups in the binder to crosslink the same. Preferable examples of the thermocurable crosslinking agent include isocyanates such as tolylene diisocyanate, hexamethylene diisocyanate, and isophorone diisocyanate; and polyisocyanates such as reaction products of these isocyanates with compounds each having a plurality of hydroxyl groups such as trimethylolpropane, and condensation products of these isocyanates. The crosslinking agent is used usually in an amount of 10 to 50 parts by weight, preferably 15 to 35 parts by weight, based on 100 parts by weight of the binder.

The binder for forming the intermediate binder layer contains an organic solvent-soluble resin or a water soluble resin. The components of the intermediate binder layer substantially consist of polymeric resins, however, may contain total 3 wt. % or less of a low molecular weight organic substance for improving the dispersibility of the resultant coating composition and an inorganic substance for controlling the electric conductivity.

As the organic solvent-soluble resin, a combination of a vinyl chloride-based resin and a polyurethane resin is used as well as the lower non-magnetic layer and the upper magnetic layer as mentioned above. Specific example of the vinyl chloride-based resin include a vinyl chloride resin, a vinyl chloride-vinyl acetate copolymer, a vinyl chloride-vinyl alcohol copolymer, a vinyl chloride-vinyl acetate-vinyl alcohol copolymer, a vinyl chloride-vinyl acetate-maleic anhydride copolymer, a vinyl chloride-hydroxyl group-containing alkyl acrylate copolymer, and nitrocellulose. Examples of the polyurethane resin include polyesterpolyurethane, polyetherpolyurethane, polyetherpolyesterpolyurethane, polycarbonatepolyurethane, polyestrepolycarbonatepolyurethane, etc. It is particularly preferable that as the binder, 50 to 95 wt. parts of a vinyl chloride-based resin is used in combination with 5 to 50 wt. parts of a polyurethane resin, per total 100 wt. parts of the binders.

Also, the intermediate binder layer contains a polymeric binder which has a functional group such as —COOH, —SO$_3$M, —OSO$_3$M, —P=O(OM)$_3$, —O—P=O(OM)$_2$ [wherein M is a hydrogen atom, an alkali metal base or an amine salt], —OH, —NR$_1$R$_2$, or —N$^+$R$_3$R$_4$R$_5$ [wherein R$_1$, R$_2$, R$_3$, R$_4$ and R$_5$ are, each independently, a hydrogen atom or a hydrocarbon group], and an epoxy group. The reason why such a binder is used is that the dispersibility of the resins is improved. When two or more resins are used in combination, it is preferable that the polarities of the functional groups of the resins are the same. In particular, the combination of resins both having —SO$_3$M groups is preferable.

To prepare a coating composition for the intermediate binder layer using the above organic solvent-soluble resin, the following can be used as the organic solvent: ketones such as acetone, methyl ethyl ketone, methyl isobutyl ketone, diisobutyl ketone, cyclohexane, isophorone, tetrahydrofurane, etc.; alcohols such as methanol, ethanol, propanol, butanol, isobutyl alcohol, isopropyl alcohol, methylcyclohexanol, etc.; esters such as methyl acetate, butyl acetate, isobutyl acetate, isopropyl acetate, ethyl lactate, glycol acetate, etc.; glycol ethers such as glycol dimethyl ether, glycol monomethyl ether, dioxane, etc.; aromatic hydrocarbons such as benzene, toluene, xylene, cresol, chlorobenzene, etc.; chlorinated hydrocarbons such as methylene chloride, ethylene chloride, carbon tetrachloride, chloroform, ethylene chlorohydrin, dichlorobenzene, etc.; N,N-dimethylformamide; hexane; etc. Each of these organic solvents may be used alone or in combination at a desired ratio.

As mentioned above, a water-soluble resin may be used as the binder for forming the intermediate binder layer. Examples of the water-soluble resin include polyvinyl alcohol, polyvinylpyrrolidone, carboxymethyl cellulose, starch, poly(sodium acrylate), poly(sodium methacrylate), etc. As the solvent, water is used. Other than water, ethanol or methyl ethyl ketone may be used alone or in combination with water. In this case, water-soluble resins such as acrylic acid-based polymers, polyvinyl alcohol, polyvinyl pyrrolidone, fatty acid acrylates, glycerin, polyethylene glycol, etc. are used. If necessary, an electric conductivity-adjusting agent such as LiNO$_3$, LiCl or the like further may be used in combination.

It is desirable to use a thermocurable crosslinking agent together with the organic solvent and the water-soluble binder. Preferred examples of the crosslinking agent include tolylene diisocyanate, hexamethylene diisocyanate, isophorone diisocyanate, etc.; and polyisocyanates such as reaction products of these isocyanates and trimethylol propane or the like, each having a plurality of hydroxyl groups, and condensation products of the above isocyanates. In general, 10 to 50 wt. parts, preferably 15 to 35 wt. parts of each of these crosslinking agents is used per 100 wt. parts of the binder.

<Backcoat Layer>

To improve the tape-traveling property or to prevent electrification of the tape, a backcoat layer may be formed on the other surface of the above non-magnetic support, that is, the surface of the non-magnetic support opposite the surface carrying the surface layer thereon). The thickness of the backcoat layer is preferably from 200 to 800 nm. When the thickness of the backcoat layer is less than 200 nm, the effect to improve the tape-traveling property is insufficient. When the thickness of the backcoat layer exceeds 800 nm, the total thickness of the magnetic tape increases, so that the recording capacity per one reel of the tape decreases. The backcoat layer is formed by a known coating method such as gravure coating, roll coating, blade coating, die coating or the like.

Generally, carbon black (CB) is added to the backcoat layer in order to improve the tape-traveling property and to prevent the electrification of the tape. As the carbon black, acetylene black, furnace black, thermal black or the like can be used. In general, carbon black with a small particle diameter and carbon black with a large particle diameter are used in combination. The particle diameter of the small particle diameter carbon black is from 5 to 200 nm, preferably from 10 to 100 nm. When the particle diameter of the small particle diameter carbon black is less than 10 nm, the dispersion of such carbon black is difficult. When the particle diameter of the small particle diameter carbon black exceeds 100 nm, such carbon black must be added in a large amount. In either case, the surface of the backcoat layer becomes coarse and thus the surface roughness of the backcoat layer may be transferred to the reverse side of the magnetic layer (embossing).

When, together with the small particle diameter carbon black, the large particle diameter carbon black having a particle diameter of 200 to 400 nm is used in an amount of 5 to 15 wt. % based on the weight of the small particle diameter carbon black, the surface of the backcoat does not become coarse, and the effect to improve the tape-traveling property is increased. The total amount of the small particle diameter carbon black and the large particle diameter carbon black is preferably from 60 to 98 wt. %, more preferably from 70 to 95 wt. %, based on the weight of the inorganic powder in the backcoat layer. The center line average height Ra of the surface of the backcoat layer is preferably from 3 to 12 nm, more preferably from 4 to 8 nm.

Preferably, the backcoat layer contains iron oxide to improve the strength. The particle size of the iron oxide to be added is preferably from 100 to 600 nm, more preferably 200 to 500 nm. The amount of iron oxide to be added is 2 to 40 wt. %, preferably 5 to 30 wt. % based on the weight of the inorganic powder. When alumina with a particle size of 10 to 600 nm is added in an amount of 0.5 to 5 wt. % based on the weight of the inorganic powder, the strength of the backcoat layer is further improved.

<Production Method>

A magnetic tape which comprises an upper magnetic layer with a desired average dry thickness of 5 to 100 nm and has a smaller fluctuation in thickness at the interface can be produced at high productivity, by providing an intermediate binder layer consisting essentially of a binder just under the upper magnetic layer. This multi-layer structure is obtained by so-called a wet-on-wet type simultaneous multi-layer applying method in which the upper magnetic layer is applied and superposed on the intermediate binder layer in a wet state. The intermediate binder layer and the upper magnetic layer are applied almost at the same time with one die coating head which has two slits for passing two coating compositions. To improve the coating stability, it is preferable that the surface tension of a solvent used in the intermediate binder layer should be higher than the surface tension of a solvent in the upper magnetic layer. Examples of a solvent having a high surface tension are cyclohexane, dioxane, etc.

Preferably, a coating composition for the upper magnetic layer and a coating composition for the intermediate binder layer are adjusted so that the ratio of the viscosities of the upper and lower layers (the viscosity of the upper magnetic layer to the viscosity of the intermediate binder layer) at a shear rate of $10^4$ s$^{-1}$ can exceed 3 during a coating operation. More preferably, this ratio is within a range of 5 to 10. By simultaneously applying the coating solutions adjusted as above, the maximum values (PVt and/or PVm) of the fluctuation at the interface between the intermediate binder layer and the upper magnetic layer, measured along the widthwise (transverse) direction and/or the lengthwise (machine) direction, can be controlled within the above specified range.

A magnetic recording medium having a three-layer structure in which a lower non-magnetic layer, an intermediate binder layer and an upper magnetic layer are laminated in this order on one surface of a non-magnetic support can be provided as follows. Firstly, the lower layer is formed by gravure coating, roll coating, blade coating, die coating or the like which is employed in a conventional method for applying a magnetic coating composition, and dried and calendered. After that, the intermediate binder layer and the upper magnetic layer are applied with a simultaneous multi-layer applying apparatus.

Otherwise, a surface-coating layer having the above-mentioned three-layer structure can be provided by simultaneously applying three layers. The simultaneous coating systems of this type are categorized to two types: i.e. one is a so-called sequential coating system in which an intermediate binder layer and an upper magnetic layer are simultaneously applied on a lower non-magnetic layer in a wet state which has been firstly applied, as soon as possible, and the other is a three-layer simultaneous coating system in which three layers are concurrently applied with one die coating head having three slits for passing coating compositions.

The surface coating layer is formed and dried, and then calendered with metal rolls. By doing so, the effects of suppressing fluctuation at the interface between the intermediate binder layer and the upper magnetic layer and fluctuation in the thickness of the upper magnetic layer can be improved. As the calender rolls, rolls formed of heat resistant plastics such as epoxy, polyimide, polyamide, polyimidoamide or the like may be used. The calendering temperature is preferably 70° C. or higher, more preferably 80° C. or higher. The linear pressure for calendering is preferably 147 kN/m (150 kg/cm) or higher, more preferably 196 kN/m (200 kg/cm) or higher, and the calendering rate is 20 to 700 m/min. The foregoing effects can be further improved by carrying out the calendering at 80° C. or higher under a linear pressure of 294 kN/m (300 kg/cm) or higher.

When no intermediate binder layer is provided, it is impossible to smoothen the interface between the upper magnetic layer and the lower non-magnetic layer, although it is possible to smoothen the surface of the upper magnetic layer by calendering in the prior art. As a result, the surface of the upper magnetic layer is smoothened, while the interface between the upper magnetic layer and the lower non-magnetic layer is waved, which leads to variation in the thickness of the upper magnetic layer.

By contrast, the following effects can be produced by providing an intermediate binder layer according to the present invention. Essentially, the waving of the surface of the lower non-magnetic layer can be evened during a coating operation. In addition, the interposing of the intermediate binder layer is effective to suppress the variation in the thickness of the upper magnetic layer to a minimum. This is because the intermediate binder layer contains substantially no filler and therefore has high degree of freedom in deformation due to heating, so that the waving of the lower non-magnetic layer can be compensated during the calendering operation, with the result that the upper magnetic layer and also the interface between the upper magnetic layer and the intermediate binder layer are smoothened and evened. Further, the interposing of the intermediate binder layer as in the magnetic recording medium of the present invention is effective to increase the saturation magnetic flux density of the upper magnetic layer even under the same calendering conditions, so that the surface roughness of the upper magnetic layer can be decreased.

The backcoat layer is applied before or after, or during the step of applying the surface coating layer and calendering the same. Further, an aging treatment at a temperature of 40 to 80° C. may be carried out so as to facilitate the curing of the surface coating layer and the backcoat layer after the application and calendering of the surface coating layer and the backcoat layer.

Preferably, the Young's modulus of the surface coating layer which comprises a lamination of the lower non-magnetic layer, the intermediate binder layer and the upper magnetic layer is 50 to 200% of an average value of the Young's moduli of the non-magnetic support in the lengthwise and widthwise directions. When the Young's modulus of the surface coating layer is controlled within this range, the durability of the magnetic tape is improved and the touch of the magnetic tape to the heads is improved. The above rate of Young's modulus is more preferably 70 to 180%, still more preferably 80 to 160%. When the Young's modulus of the surface coating layer is less than 50% of the average value of the Young's moduli of the non-magnetic support in the lengthwise and widthwise directions, the durability of the coating layer becomes poor. On the other hand, when it exceeds 200% of the same, the touch of the magnetic tape to the heads is not smooth. In this connection, as one of the methods for controlling the Young's modulus of the surface coating layer, a method of controlling the Young's modulus by changing the calendering conditions may be preferably employed in the present invention.

Further to the above conditions, the Young's modulus of the lower non-magnetic layer is preferably 60 to 99% of the Young's modulus of the upper magnetic layer; and the Young's modulus of the intermediate binder layer is preferably 10 to 60% of the Young's modulus of the upper magnetic layer. When the Young's modulus of each of the intermediate binder layer and the lower non-magnetic layer is lower than the Young's modulus of the magnetic layer, the intermediate binder and the lower non-magnetic layer function as a kind of cushion during the calendering treatment.

The dynamic frictional coefficients of the surface coating layer and the opposite backcoat layer of the magnetic recording medium of the present invention against a stainless steel are preferably 0.5 or less, more preferably 0.3 or less. The surface specific resistance (i.e. surface resistivity according to JIS) of the surface coating layer is preferably $10^4$ to $10^{11}$ ohms/sq. ($10^4$ to $10^{11}$ Ω according to the designation by JIS), and the surface electric resistance of the backcoat layer is preferably $10^3$ to $10^9$ ohms/sq. ($10^3$ to $10^9$ Ω according to the designation by JIS). A magnetic tape cartridge (or a cassette tape) provided by assembling the magnetic recording medium produced by the foregoing procedure into a tape cartridge (or a cassette) has a large recording capacity per reel and high reliability, and thus is especially excellent as a data backup tape for a computer or the like.

EXAMPLES

The present invention will be explained in detail by the following Examples, which should not be construed as limiting the scope of the present invention in any way. In Examples and Comparative Examples, "parts" are "wt. parts", unless otherwise specified.

Example 1

<Components of Coating Composition for Upper Magnetic Layer>

(1)-

| | |
|---|---|
| Ferromagnetic iron-based metal powder | 100 parts |
| (Co/Fe: 30 atomic %, | |
| Y/(Fe + Co): 8 atomic %, | |
| Al/(Fe + Co): 5 wt. % | |
| σs: 155 A·m$^2$/kg, Hc: 188 kA/m, pH: 9.5, | |
| and average length of major axis: 100 nm) | |
| Vinyl chloride-hydroxypropyl acrylate copolymer | 10 parts |
| (—SO$_3$Na group content: $0.7 \times 10^{-4}$ eq./g) | |
| Polyester-polyurethane resin | 4 parts |
| (—SO$_3$Na group content: $1.0 \times 10^{-4}$ eq./g) | |
| α-alumina | 15 parts |
| (average particle diameter: 0.2 μm) | |
| Carbon black | 2 parts |
| (average particle diameter: 75 nm, and | |
| DBP oil absorption: 72 cc/100 g) | |
| Methyl acid phosphate | 2 parts |
| Palmitic amide | 1.5 parts |
| n-Butyl stearate | 1.0 part |
| Tetrahydrofuran | 65 parts |
| Methyl ethyl ketone | 245 parts |
| Toluene | 85 parts |

(2)

| | |
|---|---|
| Polyisocyanate | 4 parts |
| Cyclohexanone | 167 parts |

<Components of Coating Composition for Intermediate Binder Layer>

(1)

| | |
|---|---|
| Vinyl chloride copolymer | 50 parts |
| (—SO$_3$Na group content: $0.7 \times 10^{-4}$ eq./g) | |
| Polyester-polyurethane resin | 25 parts |
| (Tg: 40° C., —SO$_3$Na group content: $1 \times 10^{-4}$ eq./g) | |
| Cyclohexanone | 125 parts |
| Methyl ethyl ketone | 40 parts |
| Toluene | 10 parts |

(2)

| | |
|---|---|
| Polyisocyanate | 25 parts |
| Cyclohexanone | 10 parts |
| Methyl ethyl ketone | 15 parts |
| Toluene | 10 parts |

<Components of Coating Composition for Lower Non-Magnetic Layer>

(1)

| | |
|---|---|
| Iron oxide powder | 68 parts |
| (average particle size: 110 × 20 nm) | |
| Alumina | 8 parts |
| (content of α-alumina: 50%, | |
| and average particle size: 70 nm) | |
| Carbon black | 24 parts |
| (average particle size: 25 nm) | |
| Stearic acid | 2 parts |
| Vinyl chloride copolymer | 10 parts |
| (—SO$_3$Na group content: $0.7 \times 10^{-4}$ eq./g) | |
| Polyester-polyurethane resin | 4.5 parts |
| (Tg: 40° C., —SO$_3$Na group content: $1 \times 10^{-4}$ eq./g) | |
| Cyclohexanone | 25 parts |
| Methyl ethyl ketone | 40 parts |
| Toluene | 10 parts |

(2)

| | |
|---|---|
| Butyl stearate | 1 part |
| Cyclohexanone | 70 parts |
| Methyl ethyl ketone | 50 parts |
| Toluene | 20 parts |

(3)

| | |
|---|---|
| Polyisocyanate | 4.5 parts |
| Cyclohexanone | 10 parts |
| Methyl ethyl ketone | 15 parts |
| Toluene | 10 parts |

The components (1) of the coating composition for the upper magnetic layer were kneaded with a kneader, and the knead-mixture was dispersed in a sand mill using zirconia beads with diameters of 0.5 mm for residence time of 45 minutes. To the dispersion were added the components (2) of the coating composition for the upper magnetic layer, and the mixture was stirred, filtered and subjected to ultrasonic dispersion to form the coating composition for the upper magnetic layer.

Separately, the components (1) of the coating composition for the intermediate binder layer were stirred, and the components (2) of the coating composition for the intermediate binder layer were added thereto, and the mixture was stirred and filtered to form the coating composition for the intermediate binder layer.

Separately, the components (1) of the coating composition for the lower non-magnetic layer were kneaded with a kneader and the components (2) of the coating composition for the lower non-magnetic layer were added, and the mixture was stirred and dispersed in a sand mill for residence time of 60 minutes. To the dispersion were added the components (3) of the coating composition for the lower non-magnetic layer, and the mixture was stirred and filtered to form the coating composition for the lower non-magnetic layer.

The resultant coating composition for the lower non-magnetic layer was applied on a non-magnetic support consisting of a polyethylene terephthalate film (with a thickness of 6 μm, a Young's modulus MD of 5.9 GPa in the lengthwise direction and a Young's modulus TD of 3.9 GPa in the widthwise direction, manufactured by Toray Industries, Inc.) so that the resultant coating layer could have a dry thickness of 1,100 nm and calendered. Then, the resultant lower non-magnetic layer was calendered at 90° C. Further, the coating compositions for the upper magnetic layer and the intermediate binder layer were simultaneously applied and superposed on the lower non-magnetic layer so that the upper magnetic layer and the intermediate binder layer could have thickness of 60 nm and 10 nm, respectively, after oriented in a magnetic field, dried and calendered. These superposed layers were oriented in a magnetic field and dried to provide a magnetic sheet which comprised a lamination of the lower non-magnetic layer, the intermediate binder layer and the upper magnetic layer on one surface of the non-magnetic support.

The orientation in the magnetic field was carried out by arranging N—N opposed magnets (0.5 T) in front of the drier, and arranging, in the drier, two pairs of N—N opposed magnets (0.5 T) at an interval of 50 cm and at a position 75 cm before a position where the dryness of the layer was felt by one's fingers. The coating rate was 100 m/min.

| <Components of Coating Composition for Backcoat Layer> | |
| --- | --- |
| Carbon black (average particle size: 25 nm) | 80 parts |
| Carbon black (average particle size: 370 nm) | 10 parts |
| Iron oxide (average particle size: 400 nm) | 10 parts |
| Nitrocellulose | 45 parts |
| Polyester-polyurethane resin (—SO$_3$Na content: 1.0 × 10$^{-4}$ eq./g) | 30 parts |
| Cyclohexanone | 260 parts |
| Toluene | 260 parts |
| Methyl ethyl ketone | 525 parts |

The above components of the coating composition for backcoat layer were dispersed with a sand mill for residence time of 45 minutes, and polyisocyanate (15 parts) was added to the mixture to obtain the coating composition for backcoat layer. After the filtration, the coating composition was applied on the other surface of the above magnetic sheet (i.e. the surface of the magnetic sheet opposite to the surface carrying the magnetic layer, etc. thereon) so that the resultant backcoat layer could have a dry thickness of 500 nm and calendered, and then, the backcoat layer was dried.

The magnetic sheet thus obtained was calendered with a seven-stage calender comprising metal rolls, at a temperature of 100° C. under a linear pressure of 147 N/mm (150 kg/cm), and wound onto a core and aged at 70° C. for 72 hours. After that, the magnetic sheet was cut into tapes with widths of ½ in.

A tape cut from the magnetic sheet was fed at a rate of 200 m/min. while the surface of the upper magnetic layer of the tape was being polished with a lapping tape and a blade, and wiped to provide a magnetic tape. As the lapping tape, K10000 was used; as the blade, a hard blade was used; and Toraysee® manufactured by Toray was used for wiping the magnetic layer. The magnetic tape was treated under a feeding tension of 0.29 N (30 gf). The magnetic tape thus obtained was set in a single reel type cartridge to provide a magnetic tape cartridge for a computer (hereinafter simply referred to as a computer tape).

Examples 2 to 4

Computer tapes of Examples 2 to 4 were made in the same manner as in Example 1, except that the solvent of the coating composition for the intermediate layer, the difference in viscosity between the coating composition for the upper layer and the coating composition for the intermediate layer (namely, the conditions of the ultrasonic disperser used for the coating composition for the upper layer were changed), the method of applying the lower layer, and the calendering temperature were changed as shown in Table 1.

Comparative Examples 1 to 8

Computer tapes of Comparative Examples 1 to 8 were made in the same manner as in Example 1, except that the thickness of the upper magnetic layers (adjusted by changing the amounts of the coating compositions injected), the thickness of the intermediate binder layers (adjusted by changing the amounts of the coating compositions injected), the difference in viscosity between the coating composition for the upper layer and the coating composition for the intermediate layer (namely, the conditions of the ultrasonic disperser used for the coating composition for the upper layer were changed), the use or non-use of the orientation machine for forming the upper layer, the method of applying the lower layer, and the calendering temperature were changed as shown in Table 1.

TABLE 1

| | Thickness of magnetic layer (nm) | Solvent of intermediate layer | Thickness of intermediate layer (nm) | Ratio of viscosities of coating compositions | Method of applying lower layer | Orientation machine | Clendering temperature (° C.) |
| --- | --- | --- | --- | --- | --- | --- | --- |
| Ex. 1 | 60 | Organic solvent | 10 | 3.3 | Step by step | Used | 90 |
| Ex. 2 | 60 | Organic solvent | 10 | 3.3 | Simultaneous | Used | 90 |
| Ex. 3 | 60 | Organic solvent | 10 | 6.0 | Step by step | Used | 90 |
| Ex. 4 | 60 | Organic solvent | 10 | 6.0 | Step by step | Used | 100 |
| C. Ex. 1 | 200 | None | None | None | Step by step | Used | 100 |
| C. Ex. 2 | 60 | None | None | None | Step by step | Used | 100 |
| C. Ex. 3 | 200 | None | None | None | Simultaneous | Used | 90 |
| C. Ex. 4 | 60 | None | None | None | Simultaneous | Used | 90 |
| C. Ex. 5 | 60 | Organic solvent | 120 | 6.0 | Step by step | Used | 90 |
| C. Ex. 6 | 60 | Organic solvent | 10 | 6.0 | Step by step | None | 90 |
| C. Ex. 7 | 200 | Organic solvent | 10 | 6.0 | Step by step | Used | 90 |
| C. Ex. 8 | 200 | Organic solvent | 120 | 6.0 | Step by step | Used | 90 |

<Evaluations of Properties>

The properties of the magnetic recording media were evaluated as follows.

Each of the magnetic recording media was cut along the lengthwise direction or the widthwise direction with focused ion beams (FIB), and the section of the magnetic recording medium was observed with a scanning electron microscope (SEM) of 50,000 times magnification, and photographed. After that, the interface between the upper magnetic layer and the intermediate binder layer was visually observed and was trimmed black, and the surface of the upper magnetic layer was also trimmed black. At this step, the trimming was made on the photograph, on the assumption that the inorganic filler present on the interface was not contained in the upper magnetic layer. After that, the image was analyzed with an image analysis system (OPTIMAS® manufactured by OPTIMAS), and an average value of the thickness of the upper magnetic layer was calculated. Similarly, an average value of the thickness of the intermediate binder layer was calculated.

The maximum values, PVt and PVm, of the fluctuations in the thickness at the interface between the upper magnetic layer and the intermediate binder layer in the widthwise direction and the lengthwise direction were measured as follows. Out of the peaks and the bases on the trimmed interface between the upper magnetic layer and the intermediate binder layer within a field of view with a length of 4 μm, a peak and a base which indicated the maximum difference in the thickness direction was found. The view of field was changed, and such maximum difference was found within this field of view. This procedure was repeated to find five points, and average values were determined therefrom. Then, the average values in the widthwise direction and the lengthwise direction were defined as PVt and PVm.

The center line average height Ra of the surface of the upper magnetic layer was measured at 10 points within a field of view (250×250 μm) with an optical surface roughness tester (Maxim 3D5700 manufactured by Zygo) using a MIRAU lens, and an average value of them was used. The magnetic characteristics were measured as follows. The magnetic tape was cut into pieces with predetermined lengths, and the magnetic characteristics of this test piece were measured in an external magnetic field of 1.27 MA/m (16 kOe) with VSM manufactured by Toei Kogyo.

The electromagnetic conversion characteristics of the tape were measured with a drum tester equipped with an electromagnetic induction head (track width: 25 μm, and gap: 0.2 microns) and a MR head (track width: 8 μm) in which the induction head was used to record data, and the MR head was used to reproduce the data. Both the heads were disposed at different positions relative to the rotary drum, and both the heads were vertically operated to match their tracking each other. A proper length of the magnetic tape was drawn out of the reeled magnetic tape and scrapped. Then, a further 60 cm of the magnetic tape was drawn out and cut, and was shaped into a tape with a width of 4 mm, which was then wound around the rotary drum.

PW 50 was determined as follows. A rectangular wave with a wavelength of 10,000 nm or 10 μm was written on the tape with a function generator, and an output from the MR head was read onto a digital oscilloscope. The half width of the solitary wave outputted was converted into a length, and the value of this length was defined as PW 50. Then, a relative value of PW50 was determined using that of a DDS4 tape as a reference.

Outputs and noises were determined as follows. A rectangular wave with a wavelength of 200 nm or 0.2 μm was written on the tape with the function generator, and an output from the MR head was read onto a spectrum analyzer. A value of a carrier wave with a wavelength of 0.2 μm was defined as an output C from the medium. On the other hand, a noise value N was determined as follows. When the rectangular wave with a wavelength of 0.2 μm was written on the tape, a difference obtained by subtracting an output and a system noise from the component of a spectrum equivalent to the recording wavelength of 0.2 μm or more was integrated, and the resultant integration value was used as the noise value N. The ratio of the output to the noise, C/N, was determined, and a relative value to the value of the DDS4 tape which used C and C/N as references was determined.

The evaluation results are shown in Table 2.

TABLE 2

| | PVt/d | PVm/d | Ra (nm) | Br (T) | Squareness ratio | C (dB) | C/N (dB) | PW50 (%) |
|---|---|---|---|---|---|---|---|---|
| Ex. 1 | 0.43 | 0.49 | 4.0 | 0.31 | 0.85 | −0.1 | −0.1 | 32 |
| Ex. 2 | 0.35 | 0.35 | 4.0 | 0.31 | 0.85 | 0.1 | 0.1 | 38 |
| Ex. 3 | 0.26 | 0.30 | 4.0 | 0.31 | 0.85 | 0.1 | 2.3 | 35 |
| Ex. 4 | 0.26 | 0.26 | 2.9 | 0.31 | 0.85 | 1.9 | 4.1 | 33 |
| C. Ex. 1 | 0.30 | 0.30 | 4.0 | 0.35 | 0.85 | 0.0 | −0.4 | 95 |
| C. Ex. 2 | 0.85 | 0.91 | 4.6 | 0.34 | 0.85 | −0.5 | −2.2 | 58 |
| C. Ex. 3 | 0.51 | 0.55 | 4.1 | 0.31 | 0.85 | −0.2 | −1.9 | 94 |
| C. Ex. 4 | 1.60 | 1.65 | 4.3 | 0.31 | 0.85 | −0.9 | −3.2 | 37 |
| C. Ex. 5 | 0.52 | 0.57 | 3.8 | 0.32 | 0.85 | 0.1 | −0.4 | 38 |
| C. Ex. 6 | 0.51 | 0.51 | 4.4 | 0.22 | 0.69 | −0.7 | −1.4 | 46 |
| C. Ex. 7 | 0.07 | 0.07 | 4.1 | 0.31 | 0.85 | 0.0 | 1.1 | 105 |
| C. Ex. 8 | 0.49 | 0.51 | 3.9 | 0.31 | 0.85 | 0.5 | −1.9 | 102 |

As is apparent from the results shown in Table 2, it is known that the magnetic tapes of Examples (the articles of the present invention) have narrower PW50 than the magnetic tapes of Comparative Examples. The magnetic tapes of the present invention have high C/N ratios, and particularly, the magnetic tapes of Examples 3 and 4, which have smooth interfaces between the upper magnetic layers and the intermediate binder layers, show especially high C/N.

EFFECT OF THE INVENTION

As has been fully described above, according to the present invention, the thickness of the upper magnetic layer can be reduced, and further, the fluctuation at the interface between the upper magnetic layer and the intermediate binder layer laid just under the upper magnetic layer can be controlled. By realizing this thin and uniform magnetic layer, there can be provided a magnetic recording medium which shows a smaller PW50 value and a higher C/N and which has excellent electromagnetic conversion characteristics and thus is suitable as a data backup tape for a computer or the like. Further, according to the present invention, there can be provided a magnetic recording medium which has far higher recording density and a far larger recording capacity.

The invention claimed is:

1. A magnetic tape, comprising a lower non-magnetic layer containing non-magnetic powder and a binder, and an upper magnetic layer containing ferromagnetic powder and a binder, wherein the lower non-magnetic layer is formed on a surface of a tape-form non-magnetic support, characterized in that an intermediate binder layer consisting essentially of a binder is provided just under the upper magnetic layer; the upper magnetic layer is provided on the intermediate binder layer in a wet state; the average dry thickness d of the upper magnetic layer is 5 to 100 nm; the average dry thickness of the intermediate binder layer is 10 to less than 50 nm; the squareness ratio of the upper magnetic layer in the lengthwise direction is 0.8 or more; a Young's modulus of the lower non-magnetic layer is 60 to 99% of a Young's modulus of the upper magnetic layer; and a Young's modulus of the intermediate binder layer is 10 to 60% of the Young's modulus of the upper magnetic layer.

2. A magnetic tape according to claim 1, wherein either of the ratio of PVt to the average dry thickness d of the upper magnetic layer (PVt/d) and the ratio of PVm to the average dry thickness d of the upper magnetic layer (PVm/d) is less than 0.5, provided that the maximum value of the fluctuation at the interface between the upper magnetic layer and the intermediate binder layer measured along the widthwise direction is PVt, and that the maximum value of the fluctuation at the interface between the upper magnetic layer and the intermediate binder layer measured along the lengthwise direction is PVm.

3. A magnetic tape according to claim 2, wherein the binder used in the intermediate binder layer is an organic polymer soluble in an organic solvent or water.

4. A magnetic tape according to claim 3, wherein the intermediate binder layer is provided on the lower non-magnetic layer in a wet state.

5. A magnetic tape according to claim 3, wherein the intermediate binder layer is provided after the lower non-magnetic layer is applied and dried.

6. A magnetic tape according to claim 4 or 5, wherein the center line average height (Ra) of the surface of the upper magnetic layer is 5 nm or less.

7. A magnetic tape according to claim 6, wherein the residual magnetic flux density (Br) of the upper magnetic layer is 0.3T (3,000 G) or more.

8. A magnetic tape cartridge comprising the magnetic tape according to claim 1.

9. An audio tape, video tape, or computer tape comprising the magnetic tape according to claim 1.

10. The magnetic tape according to claim 1, wherein the non-magnetic powder contained in the non-magnetic layer has a particle size of 50-400 nm.

* * * * *